Aug. 11, 1953  J. G. LEE  2,648,192
VARIABLE CAPACITY JET EXHAUST AUGMENTER
Filed Sept. 27, 1949  2 Sheets-Sheet 1
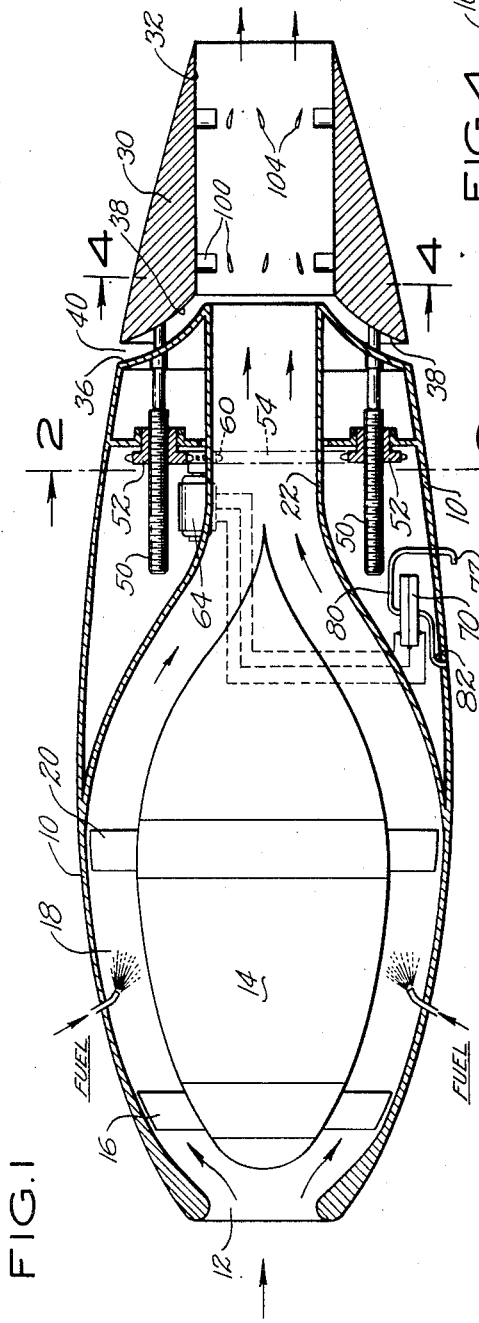
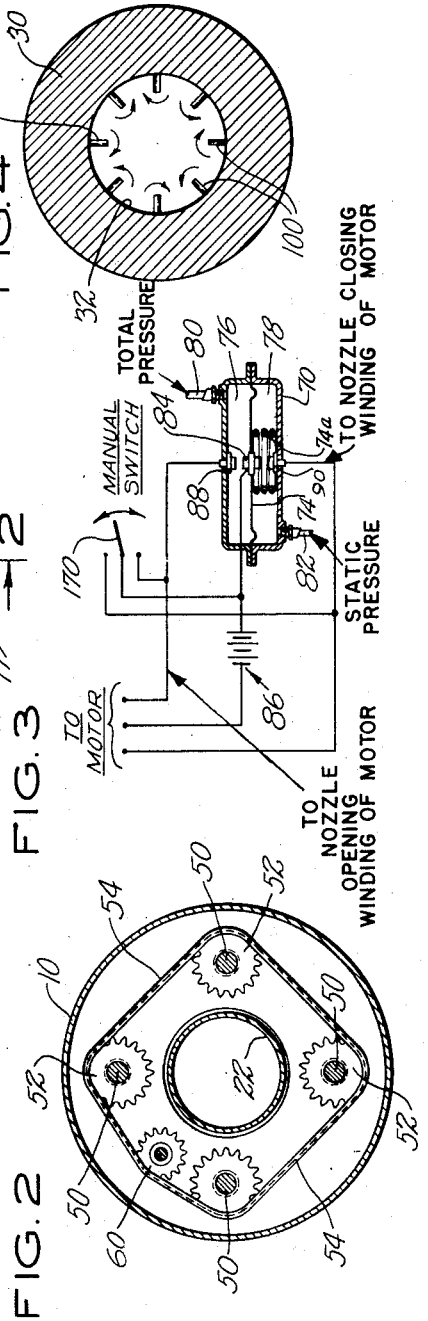
INVENTOR
JOHN G. LEE
BY *Leonard F. Weklind*
AGENT

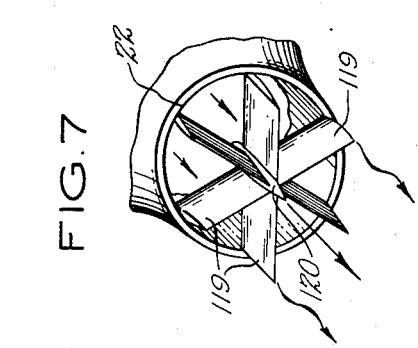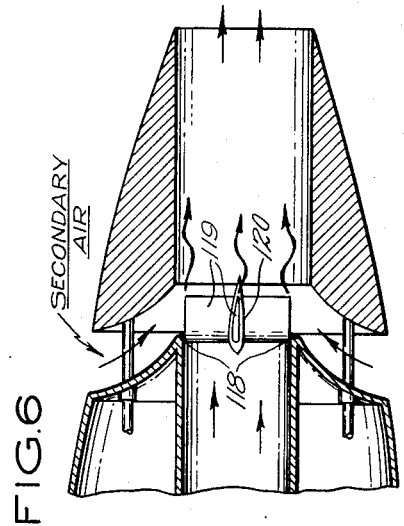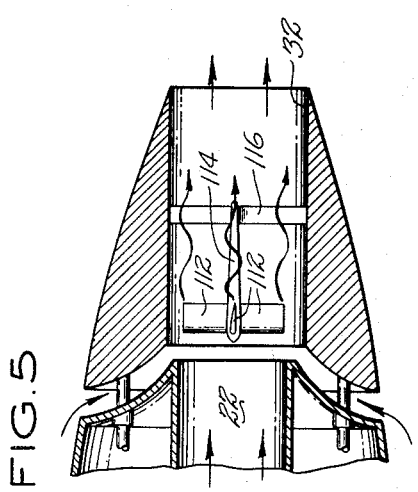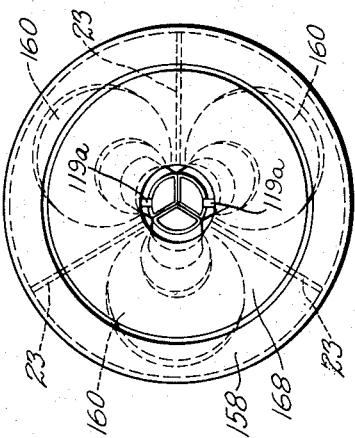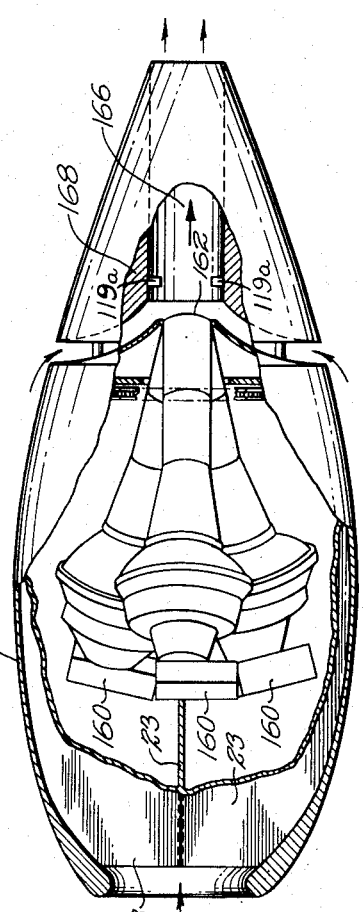

Patented Aug. 11, 1953

2,648,192

UNITED STATES PATENT OFFICE 2,648,192

VARIABLE CAPACITY JET EXHAUST AUGMENTER

John G. Lee, Farmington, Conn., assignor to United Aircraft Corporation, East Hartford, Conn., a corporation of Delaware Application September 27, 1949, Serial No. 117,958

6 Claims. (Cl. 60—35.6)

This invention relates to jet propulsion units and more particularly to improved thrust augmentation mechanism for aircraft jet power plants.

Inasmuch as the propulsive force developed by the nozzle discharge of a jet power plant is a function of the mass flow and the velocity conditions of the exit gases, it is desirable to maintain the value of these parameters as near the maximum as possible. In an aircraft, during take-off where maximum thrust is required and the forward speed is low these parameters are apt to be below the maximum desirable.

In order to provide adequate take-off power, then, it becomes necessary to augment the thrust being developed or discharged and one method entails the introduction of added mass to the jet propulsive stream issuing from the exhaust nozzle.

It is therefore an object of this invention to provide an improved thrust augmentation mechanism for aircraft jet power plants.

Another object of this invention is to provide a thrust augmenter for a jet propulsion unit whereby the capacity of the augmenter may be varied to maintain maximum thrust until sufficient speed is obtained at the air entrance to the jet power plant.

Another object of this invention is to provide a thrust augmenting mechanism for a jet propulsion power plant which is controllable between an inoperative and a maximum augmenting position.

An object of this invention is to provide thrust augmentation in a multi-jet power plant unit to reduce thrust losses when one or more of the jet units is inoperative.

Another object of this invention is to provide a variable capacity thrust augmenter for a jet propulsion unit whereby added air is induced from the airstream passing over the power plant into the propulsive jet discharge.

A still further object of this invention is to provide a controllable augmenter which is automatically operative in response to a predetermined pressure differential.

Another object of this invention is to provide planned mixing of the jet exhaust of a jet power plant and the augmenting airstream to reduce the axial length of the secondary thrust nozzle which discharges the augmented flow.

A still further object of this invention is to provide a controllable thrust agumenting mechanism of the type mentioned above which includes means for planned mixing of the main jet flow and the secondary augmenting airflow; the mixing being accomplished by properly positioned vortex producing mechanism.

These and other objects of this invention will become more readily apparent from the following detailed description of the accompanying drawings in which, Fig. 1 is a cross sectional view of a jet propulsion unit or nacelle which includes the thrust augmentation mechanism of this invention;

Fig. 2 is a cross sectional view taken along the line 2—2 of Fig. 1;

Fig. 3 is a schematic diagram of the pressure responsive electric control elements for the augmentation mechanism;

Fig. 4 is a cross section taken through the line 4—4 of Fig. 1;

Fig. 5 is a cross sectional view indicating a modified form of vortex producing mixing mechanism for the thrust augmenter;

Fig. 6 is a cross sectional view indicating a still further modification of the augmenter mixing mechanism;

Fig. 7 is a detail perspective view of the fluid mixing mechanism shown in Fig. 5; and Figs. 8 and 9 are partial cross sectional views illustrating a modified adaptation of this invention for multi-jet units.

Referring to Fig. 1, a jet propulsion unit is shown having an enclosure or cowling 10 which defines an air intake 12 and houses a jet power plant 14 comprising a compressor 16, a burner chamber 18, a turbine 20 and an exhaust nozzle 22. The intake 12 may contain a plurality of walls 23 (Figs. 8 and 9) which divide the intake air for each of the engines.

A streamline trailing portion 30 forms a continuation of the nacelle 10 and defines a secondary exhaust nozzle 32. The trailing portion 30 is axially movable from a position wherein the surfaces 36 and 38 are substantially in juxtaposition to an aft extended position, as shown, thereby forming an annular passage 40 which permits air to be inducted from the airstream passing over the cowling 10 to be inducted into the jet stream issuing from the exhaust nozzle 22. The jet exhaust flowing from the nozzle 22 acts as an ejector in combination with the annular passage 40 thereby causing an augmented mixture of exhaust gases and air to be emitted via the secondary nozzle 32.

In order to axially move the trailing section 30 a plurality of jackscrews 50 are provided including cooperating actuating sprocket type nuts 52 which are rotatably fixed to adjacent nacelle structure. The nuts 52 are rotatably driven by a chain 54 which is driven in turn by a spur gear 60 (see also Fig. 2).

A reversible electric motor 64 rotates the spur gear 60 in either direction so that by means of the jackscrew mechanism described above the aft cowling section 30 may be extended or retracted.

A pressure responsive unit 70 may be used to control the reversible motor 64 so as to obtain the proper amount of thrust augmentation in accordance with predetermined operating requirements. To this end (Fig. 3) the unit 70 includes a flexible diaphragm 74 which separates pressure chambers 76 and 78. The chamber 76 communicates with the impact tube 77 by means of a conduit 80 and the chamber 78 communicates with the static air pressure outside the nacelle by means of a conduit 82 so that a difference in pressure in the chambers will be reflected by a deflection of the flexible diaphragm 74. The diaphragm 74 carries an electrical contact 84 centrally thereof so that upward or downward deflection of the diaphragm will cause current to flow from the battery 86 through the contact point 88 or 90 to rotate the motor 64 in the desired direction. Thus when contact 84 touches contact 90 the nozzle will be actuated toward a retracted or closed position while the reverse action will ensue upon the contact 84 touching contact 88. In order to have the diaphragm 74 respond to a predetermined pressure differential a spring 74a or other biasing means may be provided for the diaphragm 74. Actually, then, the automatic operation of the control mechanism will respond to air speed.

To obtain proper thrust under the varied conditions of augmentation the secondary nozzle 32 is slightly larger in cross section than the nozzle 22. During high speed flight, then, it is preferred that a slight gap remains between the trailing surface 36 of the forward cowling portion and the surface 38 (Fig. 1) of the aft cowling section so that boundary layer air may be inducted from the outer surface of the cowl into the secondary nozzle 32 and thus maintain efficient flow volume therein.

In order to provide thorough and efficient mixing of the primary jet exhaust and the augmenting airstreams, a plurality of fins 100 of airfoil shape may be peripherally spaced within the nozzle 32 so that they terminate in vortex-producing tips adjacent the line of convergence of the jet exhaust stream and the augmenting airstream flowing into the annular chamber 40. The fins 100 may have their chordwise dimension alternately inclined relative to the axes of flow so that adjacent counterrotating tip vortices (Fig. 4) are produced which will trail downstream and provide a systemmatic planned mixing of the jet exhaust and the augmenting airstreams. In order to maintain mixing farther downstream within the nozzle 32, additional sets of fins, such as 104, may be provided. It is to be understood that the mixing described herein comprises a systemmatic displacement type of transfer of fluid particles between the converging streams of different velocities and differs from previously well-known turbulence inducing mechanisms. The vortex generating fins shown herein have been more fully described and claimed in copending patent application Serial No. 769,042, filed August 16, 1947, by Hendrik Bruynes which matured into Patent No. 2,558,816. As described in this patent vortex generators produce a planned mixing of fluids as distinguished from turbulence.

As shown in Fig. 5, the planned mixing between the converging streams may be effected by a plurality of fins 112 of airfoil shape which extend radially from a mast 114 which in turn is supported by a streamline support 116 firmly secured to the walls of the secondary nozzle 32. The vortex producing fins 119 may also be supported, as for example at 118, at the exit of the primary jet nozzle 22 as shown in Figs. 6 and 7 and would normally include a streamlined central body 120 at their point of convergence to reduce interference between adjacent fins. The vortex producing lift surfaces 104 shown in Fig. 1 may also be utilized to maintain downstream mixing in the Figs. 5 and 6 constructions.

Figs. 8 and 9 illustrate a modified use of the thrust augmenting mechanism of this invention. In these figures a multi-jet power plant is shown having a cluster of jet engines 160 mounted in a common nacelle. Each engine has an exhaust nozzle which terminates at 162 so that the combined jet exhaust from all the power plants is emitted into the secondary nozzle 166. The aft cowling section 168 which defines the nozzle 166 is axially movable so that air may be inducted from outside the unit 158 into the exhaust stream to augment the thrust as heretofore described in connection with Fig. 1.

The configuration shown herein (Fig. 8) has further utility in the event that one or more of the jet engines 160 become inoperative. Normally with a common exhaust nozzle a suction would be created therein at the exhaust of the particular inoperative engine to reduce the total available thrust developed by the remaining engines. In other words, when one of the engines is inoperative, the common exhaust pipe fails to flow full and the "separated" or irregular flow which results serves to materially reduce the thrust of the remaining engines. However, with the configuration shown in Fig. 8, if one or more of the engines becomes inoperative, a switch 170 (Fig. 3) may be provided to manually extend the aft cowling section 168 to induct added air from outside the unit to fill the nozzle, thereby eliminating the separation and also augmenting the thrust being developed by the operative engines. It should be noted that in the event one of the power plants becomes inoperative the tendency would be to decelerate the aircraft and reduce the total pressure so as to urge the contact 84 toward contact 88 rather than contact 90. Operation of switch 170 toward a nozzle extended position would hence not be hindered by the automatic control. However in order to have the switch 170 take over positive control of the reversible motor 64 under all conditions it would be an obvious expedient to provide a means for overriding the automatic control. For example, a switch may be interconnected with the manual control to disable the automatic control when the switch 170 is moved from its mid-position. Even a relay or a mechanical disabling means would be another obvious expedient since the manual control would be intended to provide primary control of the motor upon actuation thereof. In this manner the mass discharge flowing through the nozzle 166 will be maintained at an efficient value and the suction or drag within the nozzle resulting from the inoperative engine will be eliminated. In Figs. 8 and 9 the vortex producing fins 119a may be used to produce efficient planned mixing of the streams to shorten the required length of the secondary nozzle.

In operation then, during take-off for example, a certain differential will exist between the impact and static pressures of the outside airstream so that the diaphragm 74 of the pressure responsive unit 70 will cause the engagement of the contact points 88 with contact 84 to rotate the motor 64 and by means of the jackscrew mechanism extend the trailing portion 30 of the cowling (to the Fig. 1 position) to form an ejector which will induct air via the annular chamber 40 to augment the jet exhaust flowing from the nozzle 22. The aforementioned streams of exhaust gas and air will then be thoroughly mixed within the secondary nozzle 32 by means of the vortex producing fins 100 and will be ejected therefrom as an augmented stream producing an increased thrust during take-off. It should be noted that as higher speed is attained the pressure responsive unit will tend to operate in the reverse direction to retract the trailing portion 30.

In a multi-engine jet unit discharging exhaust from a common nozzle (Fig. 8) the pilot may, upon failure of one of the engines 160, operate the switch 170 (Fig. 3) to extend the aft section 168 of the cowling to increase the augmentation as required and reduce the suction adjacent the point 162 of the engine exhaust nozzle.

It is therefore apparent that as a result of this invention an improved thrust augmenting mechanism has been provided which operates automatically at relatively low forward speeds and which in its substantially inoperative position forms a streamline continuation of the jet unit enclosure thereby producing negligible drag at high speeds.

Also as a result of this invention, a simple, rugged and efficient thrust augmenting mechanism has been provide which will effectively increase the thrust of jet propulsion units at low, usually inefficient, forward speeds.

Although certain embodiments of this invention have been shown and described above, it is obvious that various changes and modifications may be made in the shape and arrangement of the various parts without departing from the scope of this novel concept.

What it is desired by Letters Patent is:

1. In a jet propulsion unit for an aircraft, an exhaust nozzle for discharging a propulsive jet stream from said unit, a variable capacity ejector mechanism for withdrawing air from without said unit into said stream, and means for mixing said air and said stream including a plurality of lift producing airfoil shaped surfaces peripherally spaced around the wall of said ejector mechanism and terminating in tips adjacent the line of convergence of said air and jet stream, adjacent surfaces being oppositely inclined relative to the axis of flow whereby adjacent counterrotating trailing vortices are produced from the tips thereof.

2. In a jet propulsion unit for an aircraft, a jet engine, an air intake and an exhaust duct for said engine, a main nozzle for directing a propulsive jet stream from said engine exhaust duct, and means for augmenting the propulsive thrust of said jet comprising an extension nozzle forming a part of said main nozzle, said extension nozzle having a cross-sectional area greater than said main nozzle, means for axially separating said nozzles to induct air from the airstream into said extension nozzle, comprising, means responsive to a differential of pressures for varying the amount of separation of said nozzles including a pressure responsive element, and electrical power means controlled by said element and operatively connected to said extension nozzle for axially moving the latter, a set of aerodynamic lift surfaces peripherally spaced adjacent the jet stream issuing from said main nozzle and terminating in vortex producing tips adjacent the line of convergence of said air and jet streams for increasing the mixing therebetween, and at least one additional set of aerodynamic lift surfaces protruding from the inner wall of said extension nozzle downstream of said first mentioned set and terminating in vortex producing tips for maintaining said mixing in said augmented jet stream each set of lift surfaces having adjacent surfaces with their chordwise dimensions oppositely inclined relative to the axis of the stream.

3. In a jet propulsion unit for an aircraft, a plurality of power plants, a plurality of exhaust nozzles for said power plants terminating in adjacent relation whereby a substantially common jet stream issues therefrom, a variable capacity ejector for inducting air from outside said unit to augment the thrust of said jet stream including a secondary nozzle for receiving said jet stream, and means for reducing drag in said jet stream and causing said stream to flow full in said secondary nozzle when any of said power plants is inoperative including manually operated control mechanism for varying the capacity of said ejector.

4. In a jet propulsion unit for an aircraft, a plurality of power plants, a plurality of exhaust nozzles for said power plants terminating in adjacent relation whereby a substantially common jet stream issues therefrom, a variable capacity ejector for inducting air from outside said unit to augment the thrust of said jet stream, means responsive to the speed of the aircraft for automatically varying the capacity of said ejector, and means for reducing drag in said jet stream when any of said power plants is inoperative including manual control mechanism for varying the capacity of said ejector.

5. In a jet propulsion unit for an aircraft, a plurality of power plants, a plurality of exhaust nozzles, one for each of said power plants, terminating in adjacent relation whereby a substantially common jet stream issues therefrom, a variable capacity ejector for inducting air from outside said unit to augment the thrust of said jet stream comprising a secondary nozzle axially movable relative to said exhaust nozzles and adapted to receive said jet stream, means for eliminating suction drag within said secondary nozzle and causing the received stream to fill said secondary nozzle when any of said power plants is inoperative comprising electrically operated control mechanism for axially moving said secondary nozzle and means providing planned intermixing in said secondary nozzle between the jet stream and the induced air.

6. In an ejector mechanism for augmenting the thrust, a jet propulsion unit, a jet exhaust nozzle for said unit, a secondary nozzle for receiving the jet from said exhaust nozzle, cooperating means carried by said nozzles forming a passage for inducting air from without said engine to augment said jet, pressure responsive means for moving said secondary nozzle along the axis of flow for varying the size of said passage, and means for mixing the exhaust and inducted airstreams comprising vanes of airfoil shape located in one of said streams and terminating in tips adjacent the line of convergence of the streams whereby trailing tip vortices are produced having their axes substantially coincident with said line of convergence, adjacent vanes having their chordwise dimensions oppositely inclined relative to the axis of jet flow.

JOHN G. LEE.

References Cited in the file of this patent

UNITED STATES PATENTS

| Number | Name | Date |
|---|---|---|
| Re. 23,149 | Lubbock et al. | Sept. 20, 1949 |
| 1,369,672 | Koenig | Feb. 22, 1921 |
| 1,405,482 | Bostedo | Feb. 7, 1922 |
| 1,493,753 | Koleroff | May 13, 1924 |
| 1,546,262 | Stahl | July 14, 1925 |
| 1,605,484 | Thompson et al. | Nov. 2, 1926 |
| 1,637,347 | Nelson | Aug. 2, 1927 |
| 2,216,653 | Sauer | Oct. 1, 1940 |
| 2,408,099 | Sherman | Sept. 24, 1946 |
| 2,453,650 | Alexanderson | Nov. 9, 1948 |
| 2,455,458 | Whittle | Dec. 7, 1948 |
| 2,487,588 | Price | Nov. 8, 1949 |
| 2,488,911 | Hepburn | Nov. 22, 1949 |
| 2,509,238 | Martin | May 30, 1950 |
| 2,523,404 | Wallace | Sept. 26, 1950 |
| 2,573,724 | Neal | Nov. 6, 1951 |
| 2,601,194 | Whittle | June 17, 1952 |

FOREIGN PATENTS

| Number | Country | Date |
|---|---|---|
| 587,558 | Great Britain | Apr. 29, 1947 |
| 614,548 | Great Britain | Dec. 17, 1948 |